United States Patent [19]
Horie et al.

[11] Patent Number: 5,209,201
[45] Date of Patent: May 11, 1993

[54] INTERNAL COMBUSTION ENGINE

[75] Inventors: Kaoru Horie; Kazutoshi Nishizawa; Takatoshi Aoki; Ryuji Matsukado; Chihaya Sugimoto; Takeshi Iwata, all of Saitama, Japan

[73] Assignee: Honda Giken Kogyo Kabushiki Kaisha, Tokyo, Japan

[21] Appl. No.: 742,831

[22] Filed: Aug. 8, 1991

[30] Foreign Application Priority Data

Aug. 10, 1990 [JP] Japan .................. 2-213376
Aug. 10, 1990 [JP] Japan .................. 2-213377

[51] Int. Cl.⁵ ............................................ F02B 31/00
[52] U.S. Cl. ........................ 123/308; 123/432; 123/90.16
[58] Field of Search ............ 123/432, 308, 90.15, 123/90.16

[56] References Cited

U.S. PATENT DOCUMENTS

| | | | |
|---|---|---|---|
| 4,667,636 | 5/1987 | Oishi et al. | 123/308 |
| 4,703,734 | 11/1987 | Aoyama | 123/90.15 |
| 4,759,321 | 7/1988 | Matsumoto | 123/90.15 |
| 4,938,188 | 7/1990 | Seki et al. | 123/90.16 |
| 4,974,566 | 12/1990 | LoRusso | 123/432 |
| 5,081,971 | 1/1992 | Inoue et al. | 123/308 |
| 5,095,859 | 3/1992 | Iwata et al. | 123/308 |

FOREIGN PATENT DOCUMENTS

| | | |
|---|---|---|
| 0367532 | 10/1988 | European Pat. Off. |
| 0353863 | 2/1990 | European Pat. Off. |
| 0359363 | 3/1990 | European Pat. Off. |

Primary Examiner—E. Rollins Cross
Assistant Examiner—Erick Solis
Attorney, Agent, or Firm—Lyon & Lyon

[57] ABSTRACT

In an internal combustion engine comprising a valve operating system connected to a pair of intake valves and arranged to open one of the intake valves only in a very small amount such that the one intake valve is brought into its substantially inoperative state, in a suction stroke mainly in a low speed rotation region of the engine, a fuel injection valve capable of injecting fuel toward a pair of intake ports independently corresponding to the intake valves, and a control means for controlling the operation of the fuel injection valve, the control means is arranged to control the fuel injection valve with a fuel injection completion time determined within a suction stroke, when the one intake valve is in the substantially inoperative state. This ensures that when the one intake valves has been brought into its substantially inoperative state, the injection of fuel by the fuel injection valve can be completed in the suction stroke, so that the injected fuel can be sequentially introduced into a combustion chamber in a condition of the other intake valve being open, thereby achieving an axially stratified air charge to provide an improved combustibility.

14 Claims, 11 Drawing Sheets

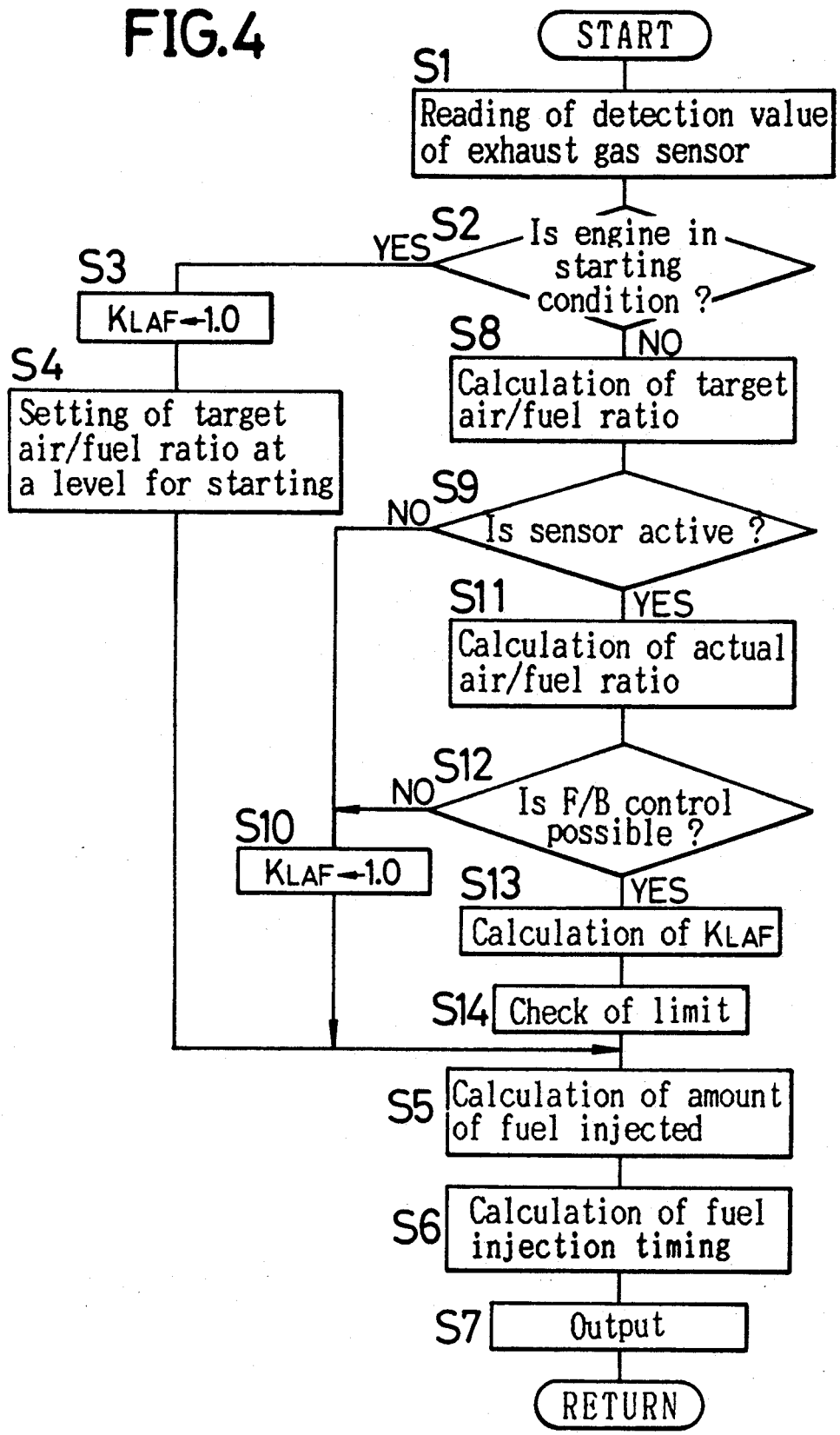

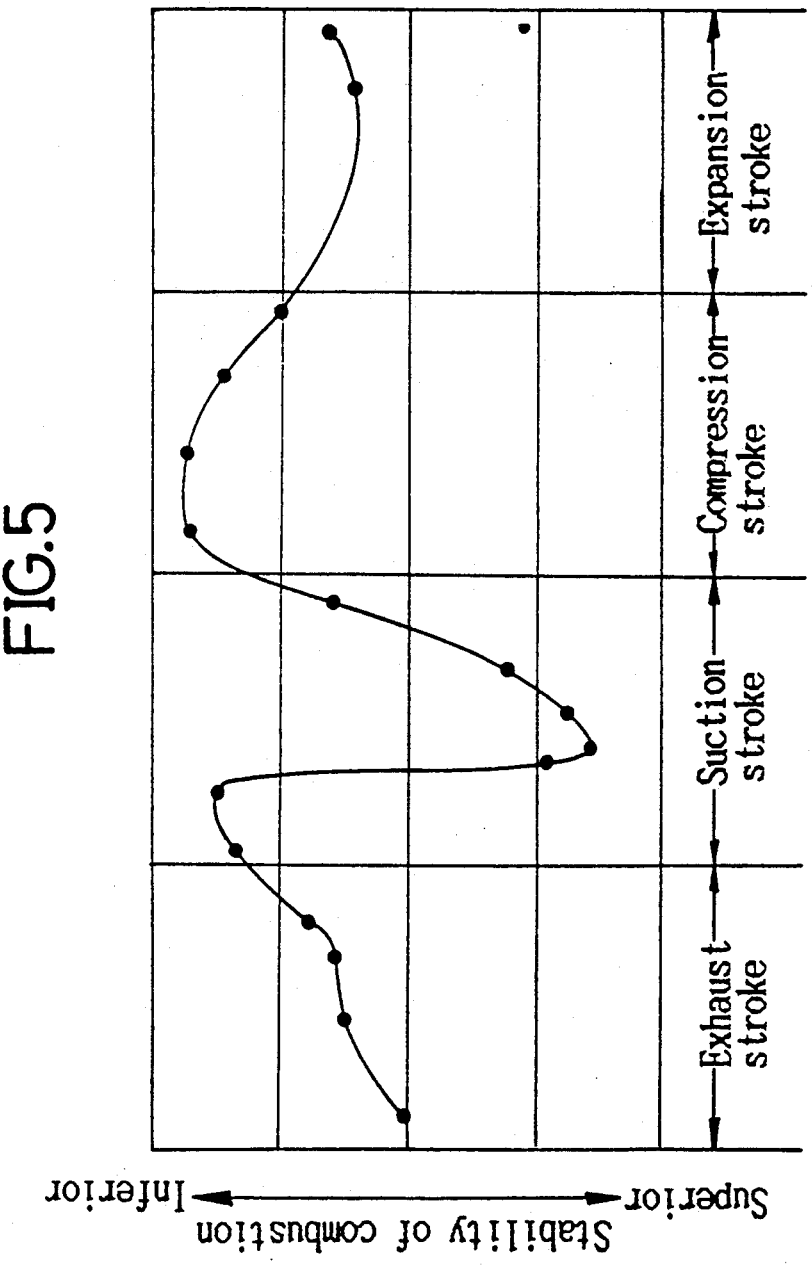

INTERNAL COMBUSTION ENGINE

BACKGROUND OF THE INVENTION

1. Field of the Invention

The field of the present invention is internal combustion engines of a type having a valve operating system connected to a pair of intake valves and arranged to open one of the intake valves only in a very small amount such that the one intake valve is brought into its substantially inoperative state, in a suction stroke mainly in a low speed rotation region of the engine, a fuel injection valve capable of injecting fuel toward a pair of intake ports independently corresponding to the intake valves, and a control means for controlling the operation of the fuel injection valve.

2. Description of the Prior Art

A conventional internal combustion engine is disclosed, for example, in Japanese Utility Model Application Laid-open No. 195913/85, wherein one of a pair of intake valves is lifted only in a very small amount in a low speed operation region of the engine, thereby preventing an increase in fuel consumption and avoiding a deposit of fuel remaining in an intake port in a substantially inoperative state to provide a stable combustion in the low speed operation region of the engine.

If the one intake valve is brought into a substantially inoperative state as in the prior art, it is possible to form a swirl within a combustion chamber by flowing of an air-fuel mixture into the combustion chamber substantially only through the other intake valve. It is conventionally known that combustibility is improved by providing an axially stratified air charge or supply wherein the concentration of fuel is varied in an axial direction in the combustion chamber to form a rich zone of a relative high concentration of fuel around a spark plug. Thus, it is believed that a combination of the swirl formation with the axially stratified air charge provides a further improved combustibility to enable stable combustion of a dilute or lean air-fuel mixture.

On the other hand, it has been definitely shown by experiments made by the present inventors that in an operational condition in which one of the intake valves is substantially in an inoperative state, an axially stratified air charge is possible only when a time of injection of fuel by the fuel injection valve is a particular time.

SUMMARY OF THE INVENTION

Accordingly, it is an object of the present invention to provide an internal combustion engine wherein an axially stratified air charge is provided in an operational condition in which one of the intake valves is substantially in an inoperative state, thereby improving the combustibility.

To achieve the above object, according to the present invention, there is provided an internal combustion engine comprising: a valve operating system connected to a pair of intake valves and arranged to open one of said intake valves only in such a very small amount that places said one intake valve into a substantially inoperative state, in a suction stroke mainly in a low speed rotation region of the engine; a fuel injection valve capable of injecting fuel toward a pair of intake ports which independently correspond to said intake valves; and a control means for controlling an operation of said fuel injection valve, wherein said control means is arranged to control said fuel injection to have a fuel injection completion time within a suction stroke and control said fuel injection when said one intake valve is in said substantially inoperative state.

This ensures that when the one intake valve has been brought into a substantially inoperative state, the injection of fuel by the fuel injection valve can be completed during the suction stroke, so that the injected fuel can be sequentially introduced into a combustion chamber in a condition of the other intake valve being open, thereby achieving an axially stratified air charge to provide an improved combustibility.

In another aspect of the present invention, there is provided an internal combustion engine comprising: a valve operating system connected to a pair of intake valves and arranged to open one of said intake valves only in such a very small amount that places the one intake valve into a substantially inoperative state, in a suction stroke mainly in a low speed rotation region of the engine; a fuel injection valve capable of injecting fuel toward a pair of intake ports which independently correspond to said intake valves; and a control means for controlling an operation of said fuel injection valve, the combustion of a dilute air-fuel mixture being possible at least in an engine operational region in which said one intake valve is in said substantially inoperative state, wherein a recess is provided in that surface of a piston which is exposed to a combustion chamber so as to form a portion of said combustion chamber, said valve operating system is arranged so as to cause an opening angle middle time for the one intake valve to come in a second half of a suction stroke, and said control means is arranged to control said fuel injection valve to have a fuel injection completion time to come in a first half of the suction stroke when said one intake valve is in said substantially inoperative state.

With such construction, combustibility can be further improved by the measures of: sequentially introducing the fuel injected from the fuel injection valve, when the one intake valve has been brought into a substantially inoperative state, into the combustion chamber in a condition of the other intake valve being open, thereby achieving an axially stratified air charge; increasing the swirl speed as a result of a compact combustion chamber being defined by provision of the recess in an upper surface of the piston; and establishing an opening angle middle time of the substantially inoperative one intake valve in a second half of the suction stroke to suppress generation of a disturbance in the swirl. Further, any variation in torque can be suppressed to a minimum by establishing the fuel injection completion time in the first half of the suction stroke.

In a further aspect of the present invention, there is provided an internal combustion engine comprising: a valve operating system connected to a pair of intake valves and a pair of exhaust valves and arranged to open one of said intake valves only in such a very small amount that places said one intake valve into a substantially inoperative state, in a suction stroke mainly in a low speed rotation region of the engine; a fuel injection valve capable of injecting fuel evenly toward a pair of intake ports which independently correspond to said intake valves; and a control means for controlling an operation of said fuel injection valve, combustion of a dilute air-fuel mixture being possible at least in an engine operation region in which said one intake valve is in said substantially inoperative state, wherein a recess is provided in that upper surface of a piston which is exposed to a combustion chamber so as to form a portion of said combustion chamber and a spark plug is disposed substantially at a central portion of a ceiling surface of the combustion chamber, and wherein said valve operating system includes a single cam shaft common to said intake valves and said exhaust valves and is arranged so as to cause an opening angle middle time for the intake valve to come in a second half of a suction stroke, and said control means is arranged to control said fuel injection valve to have a fuel injection completion time to come in a first half of the suction stroke when said one intake valve is in said substantially inoperative state.

With such construction, the combustibility can be further improved by the measures of: sequentially introducing the fuel injected from the fuel injection valve, when the one intake valve has been brought into a substantially inoperative state, into the combustion chamber in a condition of the other intake valve being open, thereby achieving an axially stratified air charge; increasing the swirl speed as a result of a compact combustion chamber being defined by disposition of the single cam shaft common to the intake valves and the exhaust valves and providing the recess in the upper surface of the piston facing the combustion chamber with the spark plug disposed substantially at the central portion of the ceiling surface thereof; and establishing an opening angle middle time of the substantially inoperative one intake valve in a second half of the suction stroke to suppress generation of a disturbance in the swirl. Further, any variation in torque can be suppressed to a minimum by establishing the fuel injection completion time in the first half of the suction stroke.

The above and other objects, features and advantages of the invention will become apparent from the following description of the preferred embodiments, taken in conjunction with the accompanying drawings.

BRIEF DESCRIPTION OF THE DRAWINGS

FIGS. 1 to 8 illustrate one embodiment of the present invention, wherein

FIG. 1 illustrates the entire construction;

FIG. 2 is a partially cutaway enlarged plan view taken along a line II—II in FIG. 1;

FIG. 4 is a flow chart illustrating a procedure for carrying out a feed-back control;

FIG. 5 is a graph illustrating results of experiments for an influence exerted on the stability of combustion at the fuel injection time;

FIG. 6 is a graph illustrating results of experiments for an influence exerted on the variation in torque at a fuel injection completion time;

FIG. 7 is a graph illustrating results of experiments for an influence exerted on the limit of combustion by an opening angle middle time for an intake valve in its substantially inoperative state; and FIGS. 8 a, b and c are graphs illustrating results of experiments for an influence exerted on the variation of torque, the fuel consumption and the nature of an exhaust gas due to a difference in opening angle middle time for the intake valve in its substantially inoperative state; and FIGS. 9 to 11 illustrate another embodiment of the present invention, wherein FIG. 9 is a longitudinal sectional side view of a valve operating system, taken along a line IX—IX in FIG. 10;

FIG. 10 is a sectional view taken along a line X—X in FIG. 9; and

FIGS. 11 a and b are diagrams illustrating a relationship between the operational condition of an intake valve and the fuel injection time.

DESCRIPTION OF THE PREFERRED EMBODIMENTS

Figure 1:
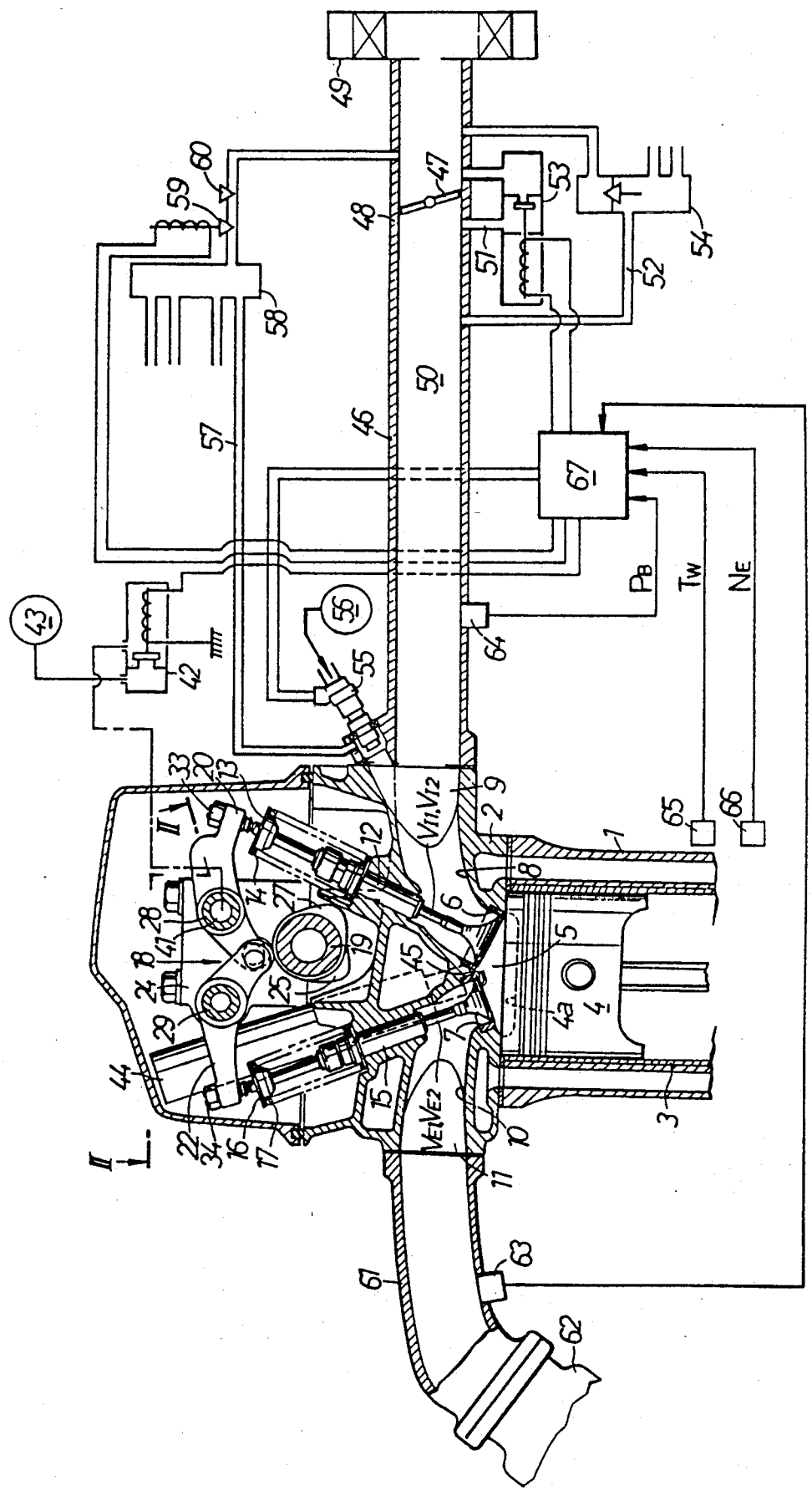

FIGS. 1 to 8 illustrate one embodiment of the present invention. Referring first to FIG. 1, a cylinder head 2 is coupled to an upper surface of a cylinder block 1, and a piston 4 having a recess 4a on an upper surface thereof is slidably received in each of a plurality of cylinders 3 provided in the cylinder block 1 to form an essential portion of an engine body in an SOHC type multi-cylinder internal combustion engine. A combustion chamber 5 is defined between the upper surface of each piston 4 and the cylinder head 2.

The cylinder head 2 is provided with a pair of intake valve bores 6 and a pair of exhaust valve bores 7 which are opened into a ceiling surface of the combustion chamber 5. Also provided in the cylinder head 2 are a pair of intake ports 8 which diverge or branch away from a single intake opening end 9 opened into one side of the cylinder head 2 and which are independently connected to the pair of intake valve bores 6, and a pair of exhaust ports 10 independently connected to the pair of exhaust valve bores 7 and also connected commonly to a single exhaust opening end 11 opened into the other side of the cylinder head 2. A pair of intake valves $V_{I1}$ and $V_{I2}$ are slidably fitted in a pair of cylindrical guides 12 disposed in the cylinder head 2 for opening and closing the intake valve bores 6, respectively. A coil valve spring 14 is interposed between the cylinder head 2 and a retainer 13 fixed to an upper or stem end of each of the intake valves $V_{I1}$ and $V_{I2}$ projecting from the cylindrical guide 12 so as to surround the corresponding intake valves $V_{I1}$ and $V_{I2}$, so that each of the intake valves $V_{I1}$ and $V_{I2}$ is biased upwardly. i.e., in a valve-closing direction by the corresponding valve spring 14. A pair of exhaust valves $V_{E1}$ and $V_{E2}$ are slidably fitted in a pair of cylindrical guides 15 disposed in the cylinder head 2 for opening and closing the exhaust valve bores 7, respectively. A coil valve spring 17 is interposed between the cylinder head 2 and a retainer 16 fixed to an upper or stem end of each of the exhaust valves $V_{E1}$ and $V_{E2}$ projecting from the cylindrical guide 12 to surround the corresponding exhaust valves $V_{E1}$, $V_{E2}$, so that each of the exhaust valves $V_{E1}$ and $V_{E2}$ is biased upwardly. i.e., in a valve-closing direction by the corresponding valve spring 17.

Figure 2:
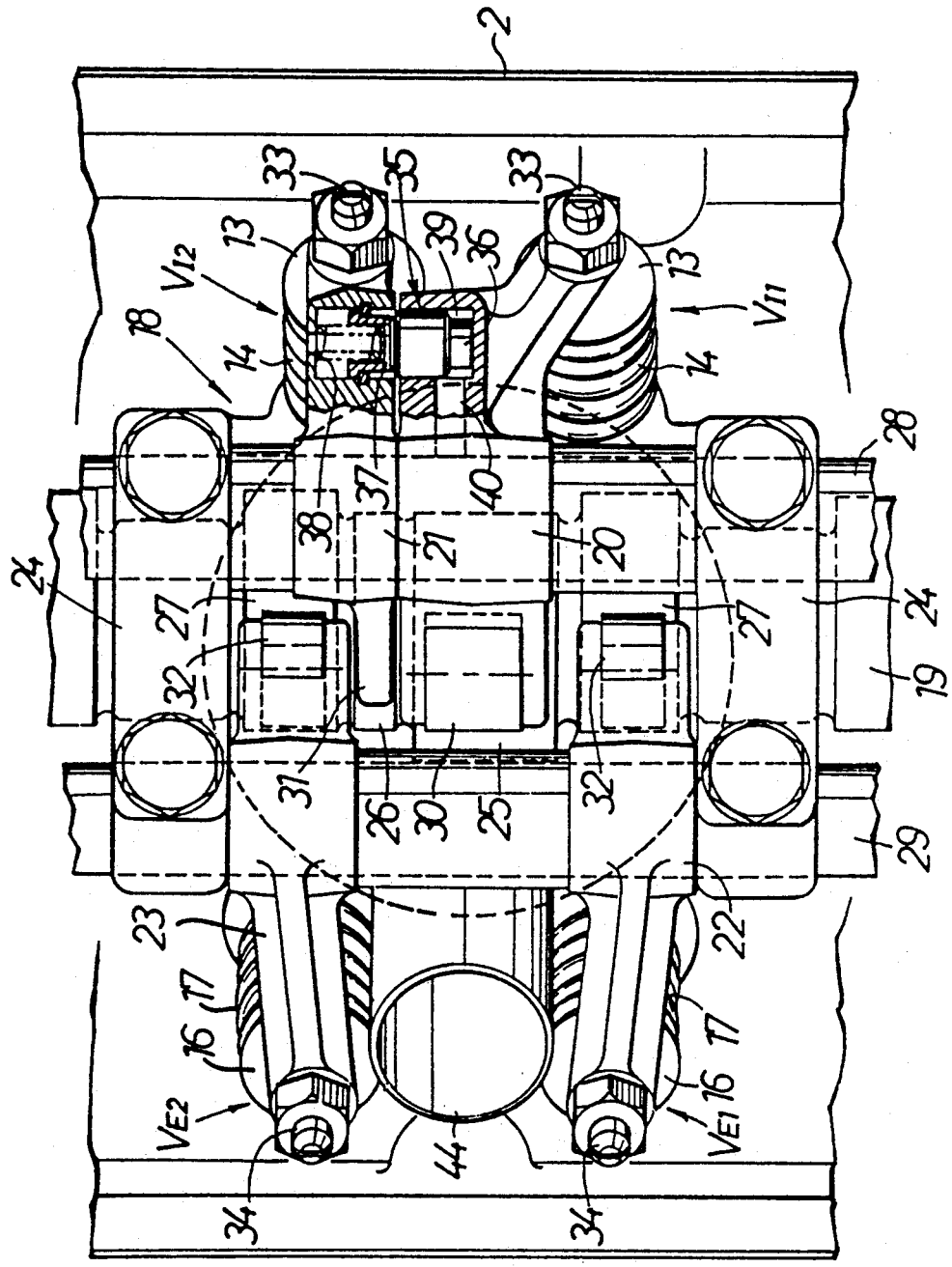

Referring also to FIG. 2, a valve operating system 18 is connected to the intake valves $V_{I1}$ and $V_{I2}$ and the exhaust valves $V_{E1}$ and $V_{E2}$. The valve operating system 18 comprises a single cam shaft 19 operatively connected to a crankshaft (not shown) with a reduction ratio of ½, a first 20 and a second intake rocker arm 21 as valve driving members for converting the rotating movement of the cam shaft 19 into opening and closing motions of the intake valves $V_{I1}$ and $V_{I2}$, and a first 22 and a second exhaust rocker arm 23 for converting the rotating movement of the cam shaft 19 into opening and closing motions of the exhaust valves $V_{E1}$ and $V_{E2}$.

The cam shaft 19 is rotatably supported by the cylinder head 2 and holders 24 which are coupled to the cylinder head 2 on opposite sides of each cylinder 3 along an axis of the cam shaft 19, and has a horizontal axis perpendicular to the axis of each cylinder 3.

Integrally provided on the cam shaft 19 are an intake opening and closing cam 25, a slightly operating cam 26 disposed adjacently one side of the intake opening and closing cam 25, and exhaust opening and closing cams 27, 27 on opposite sides of the intake opening and closing cam 25 and the slightly operating cam 26. The slightly operating cam 26 is basically formed to have an outer surface circular about the axis of the cam shaft 19 in order to ensure that one of the intake valves $V_{I2}$ is brought into a substantially inoperative state in a low speed operation region of the engine, but is provided with a slightly protruding portion in a section corresponding to a rising or higher portion of the intake opening and closing cam 25. Moreover, the width of the slightly operating cam 26 in a direction along the axis of the cam shaft 19 is relatively small.

The first intake rocker arm 20 is operatively connected to the one intake valve $V_{I1}$, and the second intake rocker arm 21 is operatively connected to the other intake valve $V_{I2}$. The intake rocker arms 20 and 21 are swingably carried on an intake rocker shaft 28 which is fixedly supported in the holders 24 above and laterally of the cam shaft 19 and has an axis parallel to the cam shaft 19. The exhaust rocker arms 22 and 23 are operatively connected individually to the exhaust valves $V_{E1}$ and $V_{E2}$ and swingably carried on an exhaust rocker shaft 29 which is fixedly supported in the holders 24 in parallel to the intake rocker shaft 28 above and laterally of the cam shaft 19.

A roller 30 is pivotably supported on one end of the first intake rocker arm 20 and is in sliding contact with the intake opening and closing cam 25. A slide contact portion 31 having a reduced width is provided at one end of the second intake rocker arm 21 in correspondence to the slightly operating cam 26 and this portion 31 is in sliding contact with the slightly operating cam 26. Also, rollers 32 are pivotably rupported on one end of each of the exhaust rocker arms 22 and 23 to come into sliding contact with the exhaust opening and closing cams 27, 27, respectively.

Tappet screws 33 are threadedly mounted in the other ends of the first and second intake rocker arms 20 and 21 to abut against the upper ends of the intake valves $V_{I1}$ and $V_{I2}$, respectively, so that the intake valves $V_{I1}$ and $V_{I2}$ are opened and closed in accordance with the swinging movements of the intake rocker arms 20 and 21. Tappet screws 34 are threadedly mounted in the other ends of the exhaust rocker arms 22 and 23 to abut against the upper ends of the exhaust valves $V_{E1}$ and $V_{E2}$, respectively, so that the exhaust valves $V_{E1}$ and $V_{E2}$ are opened and closed in accordance with the swinging movements of the exhaust rocker arms 22 and 23.

A valve operational characteristic switchover means 35 is provided in the intake rocker arms 20 and 21 for switching-over the connection and disconnection of the intake rocker arms 20 and 21 in order to switch over the operational characteristics of the intake valves $V_{I1}$ and $V_{I2}$ mainly in a low speed rotation region and mainly in a high speed rotation region of the engine.

The valve operational characteristic switchover means 35 comprises a connecting piston 36 capable of connecting the intake rocker arms 20 and 21, a restraining member 37 for restraining the movement of the connecting piston 36, and a return spring 38 for biasing the connecting piston 36 and the restraining member 37 to their disconnecting position.

The connecting piston 36 is slidably received in the first intake rocker arm 20 for movement in an axial direction parallel to the intake rocker shaft 28 to define a hydraulic pressure chamber 39 between one end of the connecting piston 36 and the first intake rocker arm 20. A communication passage 40 is provided in the first intake rocker arm 20 to communicate with the hydraulic pressure chamber 39, and an oil passage 41 (see FIG. 1) is provided within the intake rocker shaft 28 and always communicates with the communication passage 40 and thus with the hydraulic pressure chamber 39 despite the swinging of the first intake rocker arm 20. The oil passage 41 is connected to a hydraulic pressure source 43 through a connection switchover electromagnetic control valve 42, as shown in FIG. 1.

The bottomed cylindrical restraining member 37 with its closed end abutting against the other end of the connecting piston 36 is slidably received in the second intake rocker arm 21. The return spring 38 is mounted in a compressed manner between the second rocker arm 21 and the restraining member 37, so that the connecting piston 36 and the restraining member 37 abutting against each other are biased toward the hydraulic pressure chamber 39 by a spring force of the return spring 38.

In such valve operational characteristic switchover means 35, when the engine is mainly in its low speed operation, the hydraulic pressure in the hydraulic pressure chamber 39 is released by the connection switchover electromagnetic control valve 42, and the abutment surfaces of the connecting piston 36 and the restraining member 37 are in a position between the first and second intake rocker arms 20 and 21. Thus, the intake rocker arms 20 and 21 are in states in which they are angularly displaceable relative to each other, so that the first intake rocker arm 20 is swung in response to the sliding contact with the intake opening and closing cam 25 by rotation of the the cam shaft 19, thereby causing the one intake valve $V_{I1}$ to be opened and closed with a timing and an amount of lift depending upon the shape of the intake opening and closing cam 25. The second intake rocker arm 21 in sliding contact with the slightly operating cam 26 is brought into a substantially inoperative state, so that the other intake valve $V_{I2}$ can be brought into a substantially inoperative state. However, the intake valve $V_{I2}$ is not completely inoperative and can be slightly operated in an opening direction, when the one intake valve $V_{I1}$ is opened. This makes it possible to prevent the intake valve $V_{I2}$ from becoming stuck on the valve seat and the retention of fuel in the intake port 8, which may occur when the intake valve $V_{I2}$ is kept completely closed. Further, the exhaust valves $V_{E1}$ and $V_{E2}$ are opened and closed with a timing and an amount of lift corresponding to the shape of the exhaust opening and closing cams 27, 27.

Figures 3A, 3B:
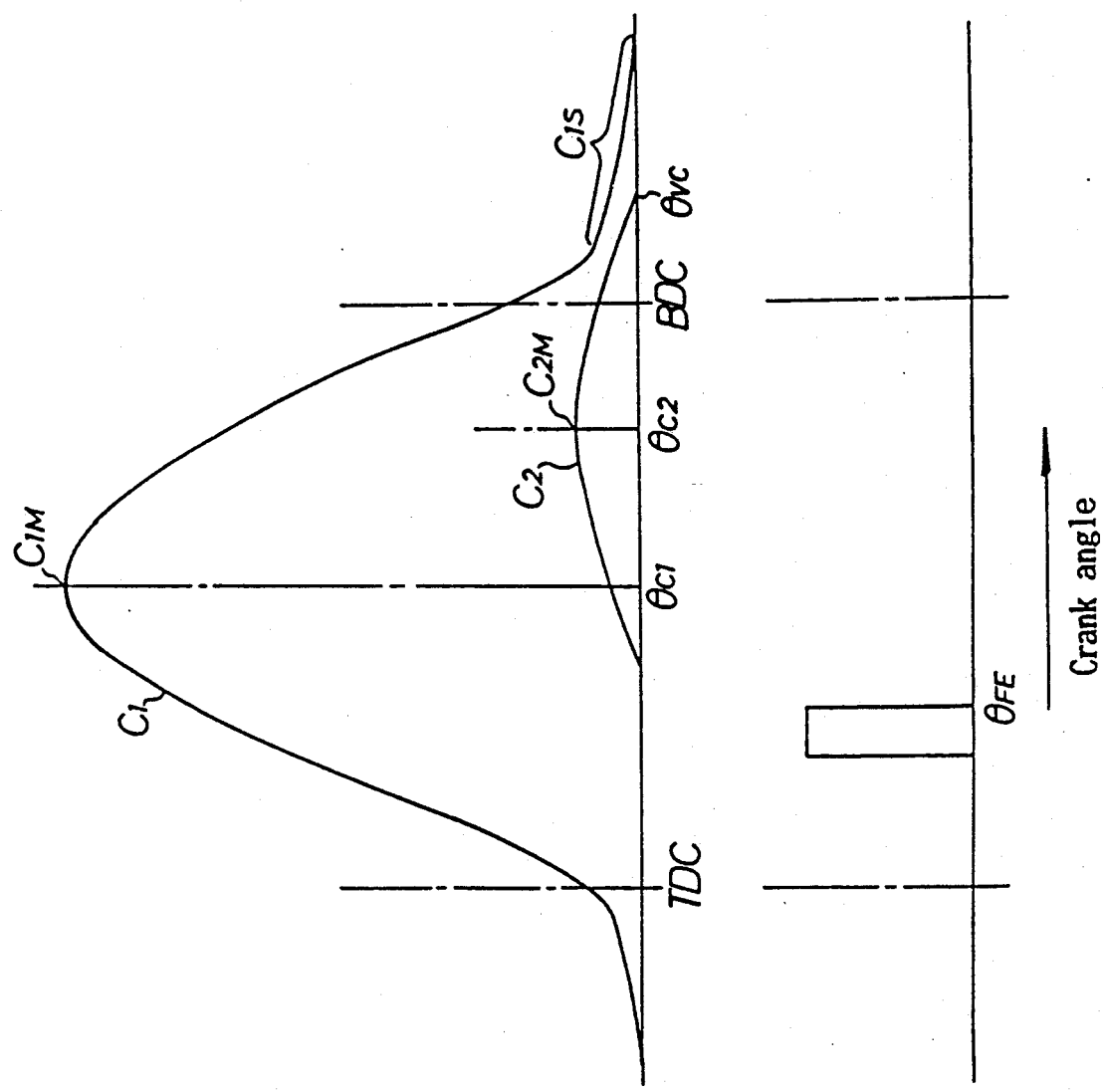
FIGS. 3a and b are diagrams illustrating a relationship between the operational condition of an intake valve and the fuel injection time.

With respect to a valve-opening lift curve $C_1$ for the intake valve $V_{I1}$ opened by the intake opening and closing cam 25, a slight valve-opening lift curve $C_2$ for the intake valve $V_{I2}$ opened by the slightly operating cam 26 is established as shown in FIG. 3a. More specifically, an opening angle middle time point $\theta_{C2}$ in the slight lift curve $C_2$ is established in the second half of a suction stroke in which the intake valve $V_{I1}$ is being opened, desirably in a range of 130 to 180 degrees from the TDC point of starting the suction stroke and at a delayed angle side along a crank angle from an opening angle middle time $\theta_{C1}$ in the valve-opening lift curve $C_1$. Desirably, the maximum lift point $C_{2M}$ in the slight lift curve $C_2$ is established at a delayed angle side along the crank angle from the maximum lift point $C_{1M}$ in the valve-opening lift curve $C_1$. Moreover, a terminal end time $\theta_{VC}$ in the slight lift curve $C_2$ is established at a terminal end buffer curve portion $C_{IS}$ in the valve-opening lift curve $C_1$ along the crank angle, i.e., at a portion corresponding to that operation profile section of the intake valve $V_{I1}$ which corresponds to a transition from a higher portion to a base circle portion of the intake opening and closing cam 25 to buffer a shock produced upon seating of the intake valve $V_{I1}$. The lift amount for the intake valve $V_{I2}$ is set, for example, in a range of 0.4 to 2.0 mm.

As used throughout this application, including the claims, the terms "substantially inoperative", "slightly operated", "slightly operating" and the like mean the operating mode or condition described above with respect to cam 26, rocker arm 21 and intake valve $V_{I2}$ as shown in FIG. 3a and as described below for the second embodiment and shown in FIG. 11 wherein the intake valve $V_{I2}$ is lifted only a very small amount compared to the lift of intake valve $V_{I1}$ during the suction stroke to admit only a small amount of air-fuel mixture compared to the air-fuel mixture admitted through intake valve $V_{I1}$.

When the engine is mainly in the high speed operation, the connection switchover electromagnetic control valve 42 is opened, so that a high hydraulic pressure is applied to the hydraulic pressure chamber 39. This causes the connecting piston 36 to be moved in a direction to increase the volume of the hydraulic pressure chamber 39 against the spring force of the return spring 38. When the axes of the connecting piston 36 and the restraining member 37 have been aligned with each other, i.e., when the intake rocker arms 20 and 21 have entered their stationary states, the connecting piston 36 is received into the second rocker arm 21, thereby providing the connection of the intake rocker arms 20 and 21, so that the second intake rocker arm 21 is swung together with the first rocker arm 20 which is in sliding contact with the intake opening and closing cam 25. This causes the intake valves $V_{I1}$ and $V_{I2}$ to be opened and closed with a timing and a lift amount depending upon the shape (a profile shown by the valve-opening lift curve $C_1$ in FIG. 3(a)) of the intake opening and closing cam 25. In addition, the exhaust rocker arms 22 and 23 cause the exhaust valves $V_{E1}$ and $V_{E2}$ to be opened and closed with a timing and a lift amount depending upon the shape of the exhaust opening and closing cam 27, 27 as in the low speed operation region.

A plug insertion cylindrical member 44 which is inclined sideways is provided in the cylinder head 2 between the exhaust rocker arms 22 and 23, and a spark plug insertion 45 inserted through the plug cylindrical member 44 is mounted in the cylinder head and exposed to a substantially central portion of the ceiling surface of the combustion chamber 5.

Referring again to FIG. 1, an air cleaner 49 is connected to the intake opening end 9 in the cylinder head 2 through an intake manifold 46 and a throttle body 48 having a throttle valve 47. An intake passage 50 is provided in the throttle body 48 and the intake manifold 46 to extend from the air cleaner 49 to the intake opening end 9. A bypass passage 51 and a first idle passage 52 are connected in parallel to the intake passage 50 around the throttle valve 47. A bypass electromagnetic control valve 53 is provided in the bypass passage 51, and a wax-operated valve 54 is provided in the first idle passage 52 and operated in accordance with the temperature of cooling water for the engine body.

A fuel injection valve 55 is mounted to the end of the intake manifold 46 closer to the cylinder head 2 to uniformly inject fuel through the intake opening end 9 toward the intake ports 8, and a fuel supply source 56 is connected to the fuel injection valve 55.

The fuel injection valve 55 is arranged so that fuel supplied from the fuel supply source 56 can be injected therefrom, and an assist air for finely atomizing the injected fuel can be injected therefrom. A passage 57 for supplying the assist air is connected to the fuel injection valve 55. The passage 57 is also connected to an air header 58 which is connected through an electromagnetic air flow rate control valve 59 and an idle adjusting screw 60 to the intake passage 50 upstream of the throttle valve 47.

A catalytic converter 62 is connected to the exhaust opening end 11 in the cylinder head 2 through an exhaust manifold 61 to which is mounted an exhaust gas sensor 63 capable of linearly detecting the concentration of $O_2$ in an exhaust gas.

The operations of the connection switchover electromagnetic control valve 42, the bypass electromagnetic control valve 53, the fuel injection valve 55 and the electromagnetic air flow rate control valve 59 are controlled by a control means 67 comprising a computer. An intake pressure $P_B$ detected by an intake pressure sensor 64, a cooling water temperature $T_W$ detected by an engine cooling water temperature sensor 65 and an engine revolution number $N_E$ detected by a rotation number sensor 66 are supplied to the control means 67, and in order to provide a feed-back control during combustion of a dilute mixture in the engine, a detection value provided by the exhaust gas sensor 63 is supplied to the control means 67.

The control means 67 controls the operation of the valve operational characteristic switchover means 35 in such manner that when the engine is mainly in a low speed rotation region, the intake rocker arms 20 and 21 are disconnected to bring one of the intake valves $V_{I2}$ into its substantially inoperative state, and when the engine is mainly in a high rotation region, the intake rocker arms 20 and 21 are connected to each other to open and close the intake valves $V_{I1}$ and $V_{I2}$ by the intake opening and closing cam 25. The control means 67 also controls the time of injection of the fuel by the fuel injection valve 55, when the engine is mainly in the low rotation region, i.e., when one of the intake valves $V_{I2}$ is in its substantially inoperative state, in such a manner that a fuel injection completion time $\theta_{FE}$ is in the suction stroke, desirably in the first half of the suction stroke, e.g., in a range of 50 to 90 degrees from the TDC point starting the suction stroke as shown in FIG. 3(b).

In addition, the control means 67 controls the amount of fuel injected from the fuel injection valve 55 to provide the combustion of a dilute mixture when the engine is mainly in the low speed rotation region and provides a feed-back control of the amount of fuel injected on the basis of a detection value provided by the exhaust gas sensor 63 according to a procedure shown in FIG. 4, during such combustion of the dilute mixture.

Referring to FIG. 4, the detection value provided by the exhaust gas sensor 63 is read at a first step S1. It is decided at a step S2 whether or not the engine is in its starting state. If the engine is in its starting state, processing is advanced from the second step S2 to a third step S3 at which a correcting factor $K_{LAF}$ used in a calculation of the amount of fuel injected which will be described hereinafter is set to "1.0". A target fuel-air ratio is set to a level suitable for starting the engine at a fourth step S4 and then, the amount of fuel injected is calculated at a fifth step S5.

In the calculation of the amount of fuel injected at the fifth step S5, practically, the time $T_I$ of injection from the fuel injection valve 55 is calculated according to the following expression (1):

$$T_I = T_{IM} \times K_{CMDM} \times K_{LAF} \times K_I + C \qquad (1)$$

wherein $T_{IM}$ is a basic injection time previously set on the basis of the engine revolution number $N_E$ and the intake pressure $P_B$, and $K_{CMDM}$ is a correcting factor for correcting, by an intake air amount, the target air-fuel ratio previously set on basis of the engine revolution number $N_E$ and the intake pressure $P_B$. Basically, the injection time for the target air-fuel ratio is found by $(T_{IM} \times K_{CMDM})$. In addition, $K_{LAF}$ is a correcting factor in the feed-back control in accordance with the detection value provided by the exhaust gas sensor 63, wherein when $K_{LAF}$ is 1.0, the feed-back control is not carried out. Further, $K_1$ is a correcting factor based on the water temperature, the atmospheric pressure and the like, and C is a correcting factor based on the battery voltage, the vehicle acceleration and the like influencing the fuel injecting operation of the fuel injection valve 55.

At a sixth step S6, the fuel injection start time is calculated in such a manner that the fuel injection completion time $\theta_{FE}$ is within the suction stroke, desirably within the first half of the suction stroke, taking the engine revolution number $N_E$ into consideration. At a next seventh step S7, the fuel injection time $T_I$ and thus the amount of fuel injected is supplied with the timing calculated at the sixth step S6.

If it has been decided at the second step S2 that the engine is advancing from its starting state to its usual operating state, then the processing is advanced from the second step S2 to an eighth step S8 at which a target air-fuel ratio is calculated according to a map which has been previously set on the basis of the engine revolution number $N_E$ and the intake pressure $P_B$. At a next ninth step S9, it is decided whether or nor the exhaust gas sensor 63 is active. This means that whether or nor the exhaust gas sensor 63 can fulfil a normal detecting function is decided, for example, by the temperature of the exhaust gas sensor 63. If it has been decided that the exhaust gas sensor 63 is not active, the correcting factor $K_{LAF}$ is set to "1.0" at a tenth step S10, and the processing is advanced to the fifth step S5. If it has been decided that the exhaust gas sensor 63 is active, the processing is advanced to an eleventh step S11.

At the eleventh step S11, the actual air-fuel ratio is calculated on the basis of the detection value of the exhaust gas sensor 63. More specifically, the exhaust gas sensor 63 linearly produces a voltage according to the concentration of $O_2$ in the exhaust gas, so that the actual air-fuel ratio is calculated according to a table previously set in accordance with the voltage.

At a twelfth step S12, it is decided whether or not the feed-back control is possible. More specifically, when cutting of fuel is being carried out by a control of the engine revolution number, a control of the vehicle speed or a traction control, as well as when immediately after the cutting of fuel has been carried out, it is meaningless to carry out the feed-back control based on the detection value of the exhaust gas sensor 63. In addition, when the temperature $T_W$ of cooling water for the engine is extremely low, atomization of the injected fuel is insufficient, and the fuel is liable to be deposited onto an inner surface of the intake port 8. Therefore, the actual air-fuel ratio provided on the basis of the detection value of the exhaust gas sensor 63 indicates a lower concentration of fuel. If the feed-back control is conducted in such a condition, the concentration of fuel is unnecessarily increased. Thus, the feed-back control is prohibited when the fuel cutting is being carried out, and immediately after the fuel cutting has been carried out, as well as when the engine-cooling water temperature $T_W$ is extremely low, and then, the processing is advanced from the twelfth step S12 to the tenth step S10. In a case other than the above cases, the feed-back control is carried out, and the processing is advanced from the twelfth step S12 to a thirteenth step S13.

At the thirteenth step S13, a correcting factor $K_{LAF}$ is calculated on the basis of a difference between the target air-fuel ratio and the actual air-fuel ratio. At a next fourteenth step S14, it is decided whether or not the calculated correcting factor $K_{LAF}$ is within a given range. If the calculated correcting factor $K_{LAF}$ exceeds such range, a previously determined maximum or minimum value is supplied as the correcting factor $K_{LAF}$, the processing is advanced to the fifth step S5 at which the amount of fuel injected is calculated.

The operation of this embodiment will now be described. When the engine is mainly in the high speed rotation region, the control means 67 causes the intake rocker arms 20 and 21 to be connected by the valve operational characteristic switchover means 35, and the valve operating system 18 causes the intake valves $V_{I1}$ and $V_{I2}$ to be opened and closed with a timing and a lift amount determined by the intake opening and closing cam 25.

When the engine is mainly in the low speed rotation region, the valve operational characteristic switchover means 35 is switched over by the control means 67 into a state to disconnect the intake rocker arms 20 and 21. This causes one of the intake valves $V_{I2}$ to be brought into its substantially inoperative state, so that only the other intake valve $V_{I1}$ is opened and closed with a timing and a lift amount determined by the intake opening and closing cam 25.

This permits an air-fuel mixture to flow through substantially only one of the intake valve bores 6 into the combustion chamber 5, and a swirl is produced within the combustion chamber 5. Moreover, the injection of fuel by the fuel injection valve 55 during production of the swirl is controlled so that it is completed during the suction stroke. This ensures that the injected fuel can be sequentially introduced into the combustion chamber 5 through one intake valve bore 6 corresponding to the intake valve $V_{I1}$ which is being opened and closed, thereby achieving an axial stratified air charge, leading to an improvement in combustibility, as shown in FIG. 5 illustrating results of experiments made by the present inventors.

Figure 6:
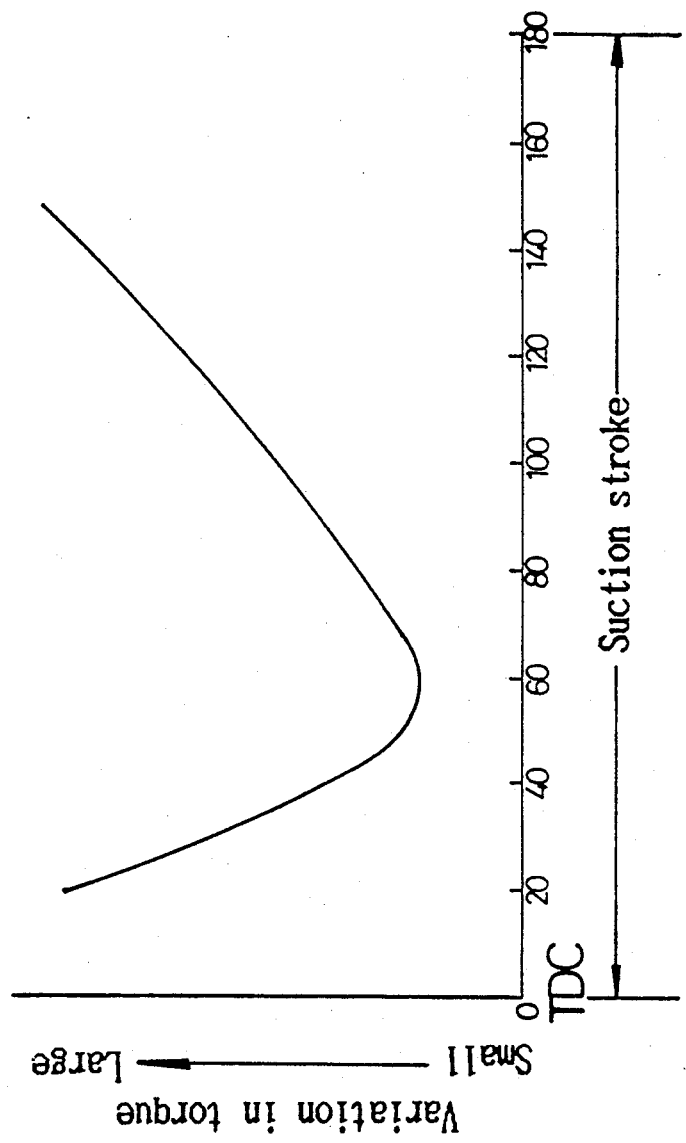

The time $\theta_{FE}$ for completing the fuel injection by the fuel injection valve 55 is set in the first half of the suction stroke, desirably in a range of 50 to 90 degrees from the start of the suction stroke, as shown in FIG. 3(b). Such establishment ensures that the rate of variation in torque can be suppressed to a small level, as shown in FIG. 6 illustrating the results of experiments made by the present inventors.

Figure 7:
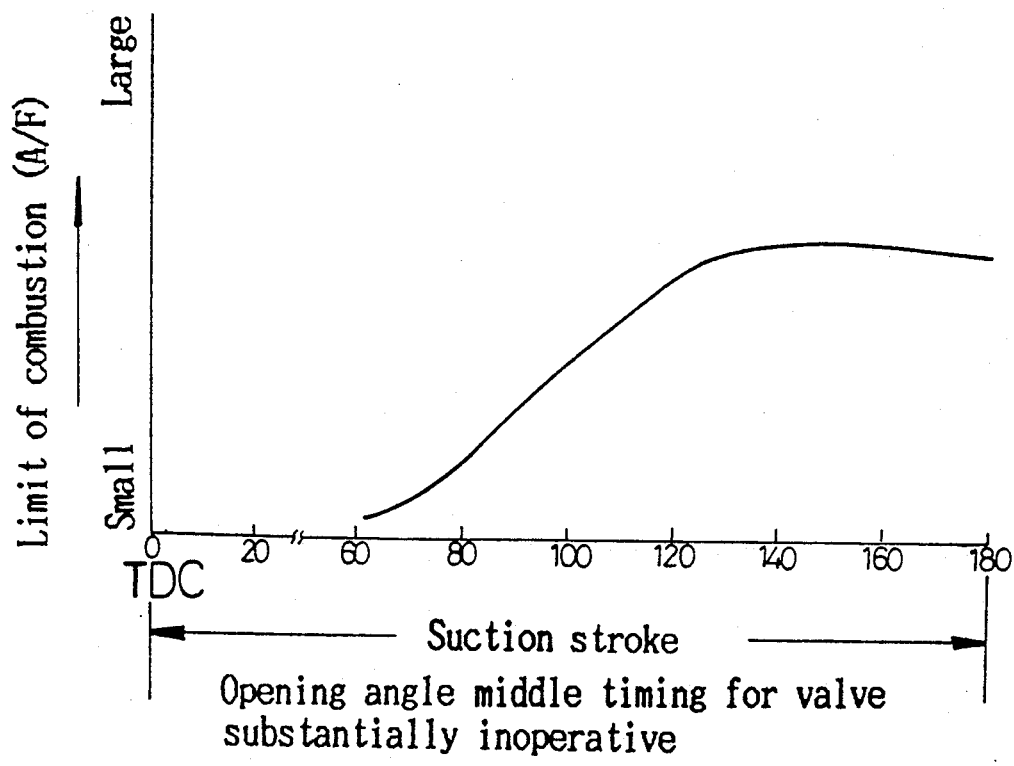
Figure 8A:
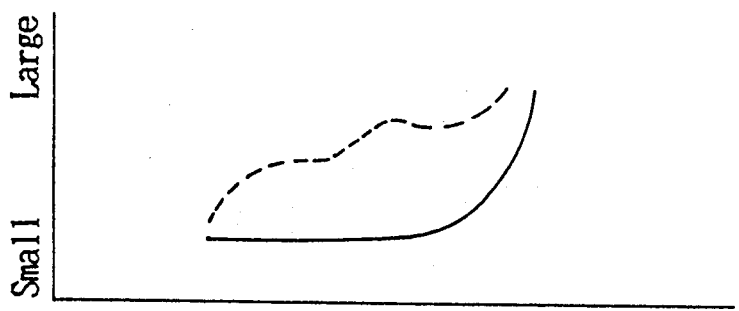
Figure 8B:
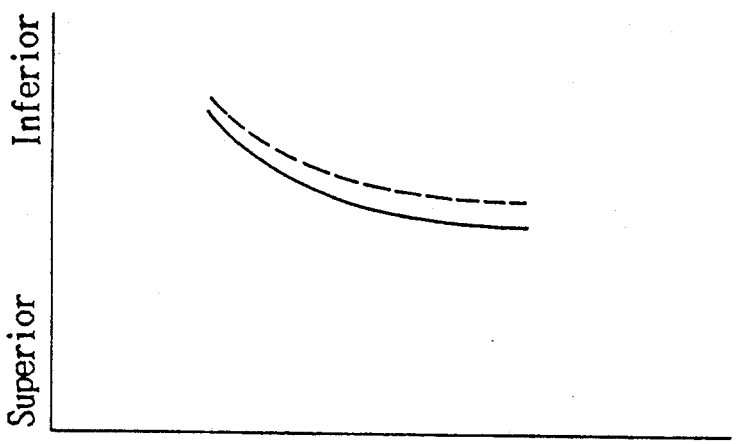
Figure 8C:
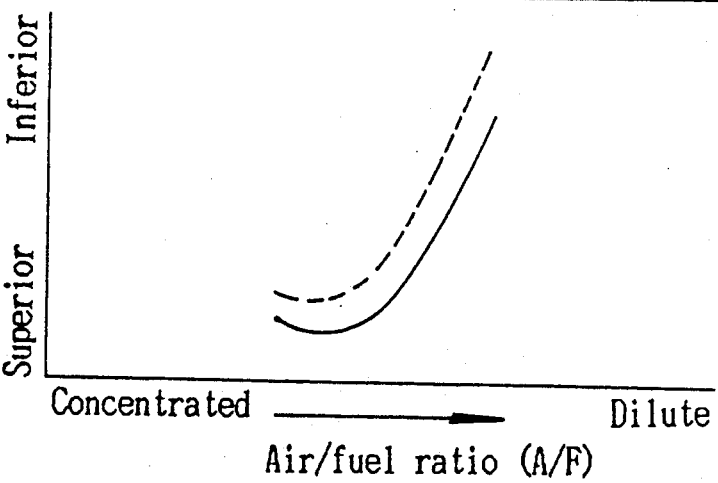

The opening angle middle time $\theta_{C2}$ for the intake valve $V_{I2}$ slightly opened by the slightly-operating cam 26 is established in the second half of the suction stroke, desirably in a range of 130 to 180 degrees from the TDC point starting the suction stroke, as shown in FIG. 3(a), and moreover, the maximum lift point $C_{2M}$ in the slight lift curve $C_2$ is established at a point delayed angularly along the crank angle from the maximum lift portion $C_{1M}$ in the valve-opening lift curve $C_1$. Such establishment makes it possible to suppress the generation of a disturbance in the swirl which may otherwise result from slight opening of the intake valve $V_{I2}$. Results of experiments for determining the limit of combustion at the opening angle middle time $\theta_{C2}$ are as shown in FIG. 7. It is apparent from FIG. 7 that the limit of combustion of a dilute mixture is improved if the opening angle middle time $\theta_{C2}$ is established in the second half of the suction stroke, desirably in a range of 130 to 180 degrees from the TDC point starting the suction stroke. In addition, results of experiments made by the present inventors for an influence exerted on a variation in torque and a fuel consumption due to a difference in opening angle middle time $\theta_{C2}$ are as shown in FIG. 8, wherein if the results obtained when the opening angle middle time $\theta_{C2}$ has been established in the middle of the suction stroke are shown by a curve indicated by a dashed line, the results obtained when the opening angle middle time $\theta_C$ has been established in the second half of the suction stroke are as shown by a curve indicated by a solid line. Therefore, according to the present invention, it is possible to suppress the variation in torque and the fuel consumption to a low level, leading to an improvement in nature of the exhaust gas.

In such internal combustion engine, a recess 4a is provided in an upper surface of the piston 4 facing the combustion chamber 5 to enable reduction in size of the combustion chamber 5. In addition, since the valve operating system 18 includes the single cam shaft 19 common to the intake valves $V_{I1}$ and $V_{I2}$ and the exhaust valves $V_{E1}$ and $V_{E2}$, and the spark plug 45 is disposed at the substantially central portion of the ceiling surface of the combustion chamber 5, it is possible to reduce the angle formed by axes of the intake valves $V_{I1}$ and $V_{I2}$ and the exhaust valves $V_{E1}$ and $V_{E2}$ in a projection view on a plane including the axis of the cylinder 3. Even this enables reduction in size of the combustion chamber 5. Such compact combustion chamber 5 ensures that the speed of a swirl produced in the combustion chamber 5 can be increased, leading to a further improvement in combustibility.

Moreover, in a condition in which the intake valve $V_{I2}$ has been brought into its substantially inoperative state mainly in the low speed rotation region of the engine, the combustion of a dilute air-fuel mixture is conducted. By a feed-back control of the amount of fuel injected from the fuel injection valve 55 on the basis of the detection value by the exhaust gas sensor 63 during such combustion, the combustion of a dilute mixture can be conducted while maintaining a good combustibility in the combustion chamber, leading to an improved dilute mixture combustibility to provide a reduction in fuel consumption. If the fine atomization of the injected fuel is provided by the assist air in the fuel injection valve 55, the dilute mixture combustibility is further improved.

The intake valve $V_{I2}$ is brought into its slightly opened and substantially inoperative state ensures that the fuel injected from the fuel injection valve 55 can be prevented from being resident in the intake port 8 corresponding to the intake valve $V_{I2}$, and any variation in air-fuel ratio can be avoided.

In switching-over the intake rocker arms 20 and 21 from the disconnected state to the connected state by the valve operational characteristic switchover means 35 when the operation region of the engine is changed from the low speed rotation region to the high speed rotation region, in a condition of the connecting piston 36 of the valve operational characteristic switchover means 35 being slightly fitted into the second intake rocker arm 21, such switching-over may fail due to releasing of such fitting as a result of striking of the first rocker arm 20 by the intake opening and closing cam 25. If such failure of the switching-over occurs in the middle of operation of the intake valve $V_{I1}$ in the opening direction, the second intake rocker arm 21 is disconnected from the first intake rocker arm 20 in the middle of its swinging movement in the valve-opening direction together with the first intake rocker arm 20, and the intake valve $V_{I2}$ is turned in the closing direction by the action of the valve spring 14 in the middle of the opening operation thereof. If such turning in the closing direction occurs in a relative high lift position, there is an undesirable possibility that the intake valve $V_{I2}$ shockingly seats on the valve seat. According to this embodiment of the present invention, however, as described above it is advantageously arranged at, the slightly-operating cam 26 is provided on the cam shaft 19 in correspondence to the second intake rocker arm 21, and the opening angle middle time $\theta_{C2}$ for the intake valve $V_{I2}$ slightly opened by the slightly-operating cam 26 is established in the second half of the suction stroke and moreover, the valve-closing time $\theta_{VC}$ is established in the vicinity of the buffer curve section $C_{IS}$ in the opening lift curve $C_1$ for the intake valve $V_{I1}$ opened by the intake opening and closing cam 25. Thus, in the suction stroke after the intake valve $V_{I1}$ has been lifted to a relative high position, when the connection of the first and second intake rocker arms 20 and 21 is released, the operations of the second intake rocker arm 21 and the intake valve $V_{I2}$ are restrained by the slightly-operating cam 26. For this reason, even if the intake valve $V_{I2}$ is turned in the closing direction from the relative high lift position due to a failure of switching-over from the low speed rotation region to the high speed rotation region by the valve operational characteristic switchover means 35, the restraint of the operation of the second intake rocker arm 21 in the valve-closing direction by the slightly-operating cam 26 enables any shocking seating of the intake valve $V_{I2}$ to be avoided, thereby preventing the generation of any shock sound.

When the engine is mainly in the low speed rotation region, the valve operational characteristic switchover means 35 is switched over by the control means 67 into its state to release the connection of the intake rocker arms 20 and 21. This causes one of the intake valves $V_{I2}$ to be brought into the substantially inoperative state, so that only the other intake valve $V_{I1}$ is opened and closed with a timing and a lift amount determined by the intake opening and closing cam 25.

Figure 9:
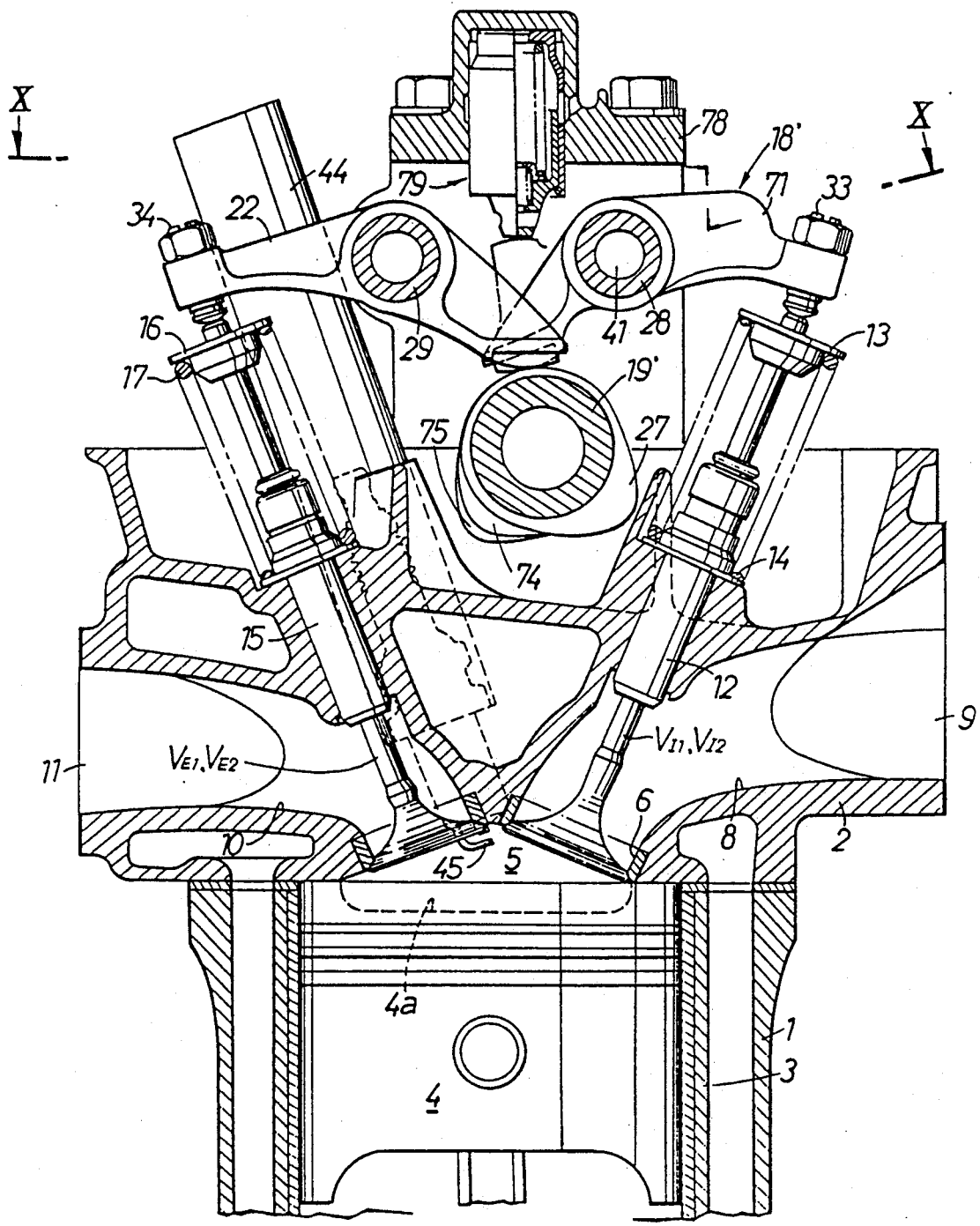
Figure 10:
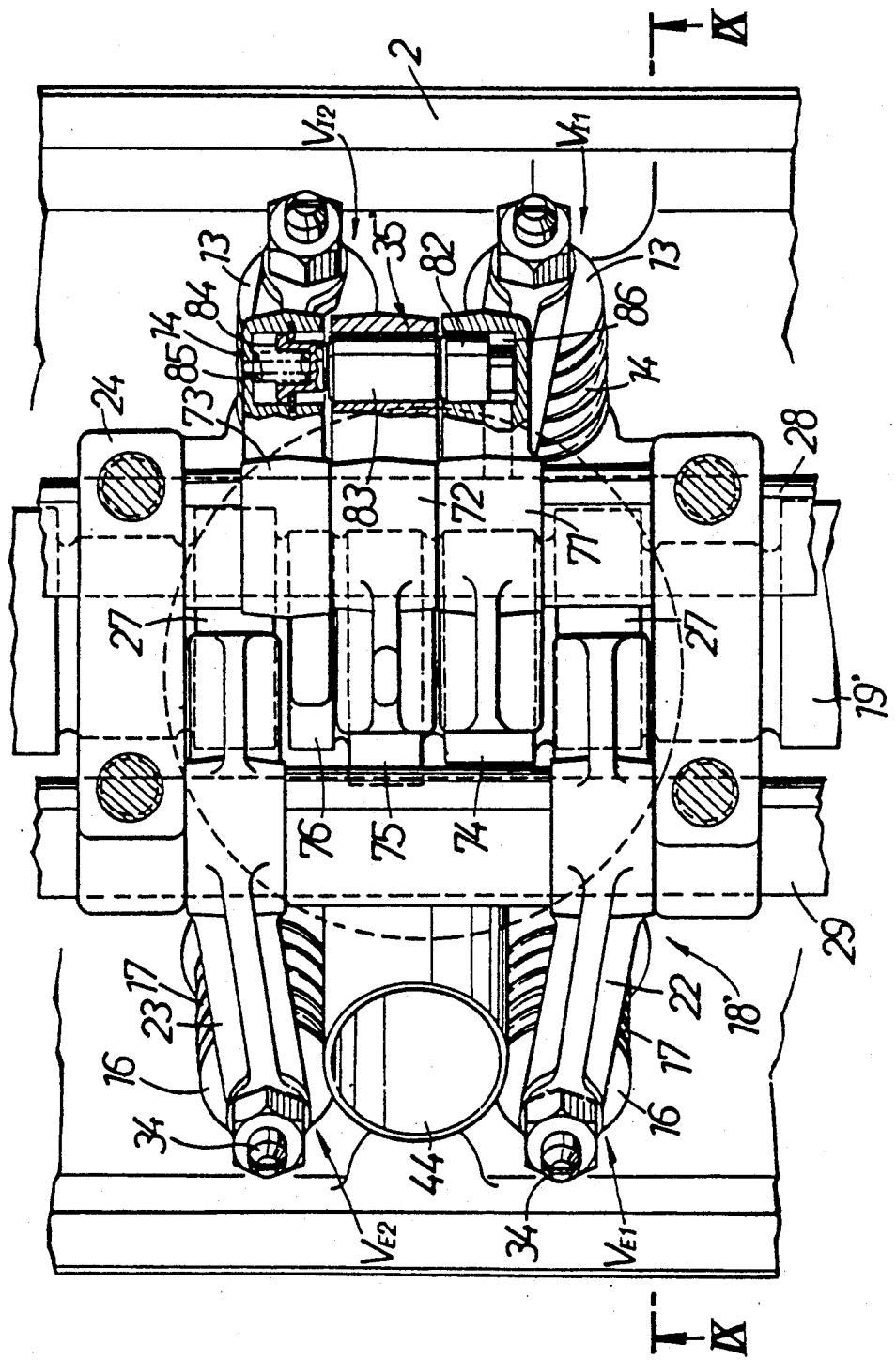
Figure 11A:
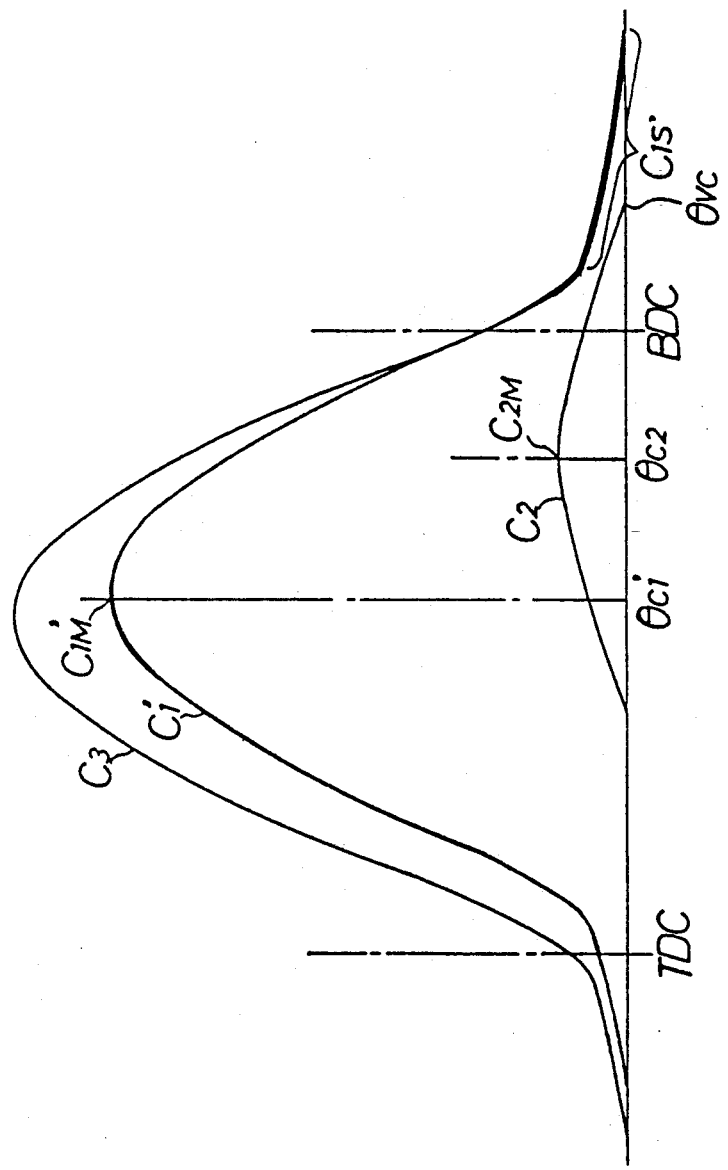
Figure 11B:
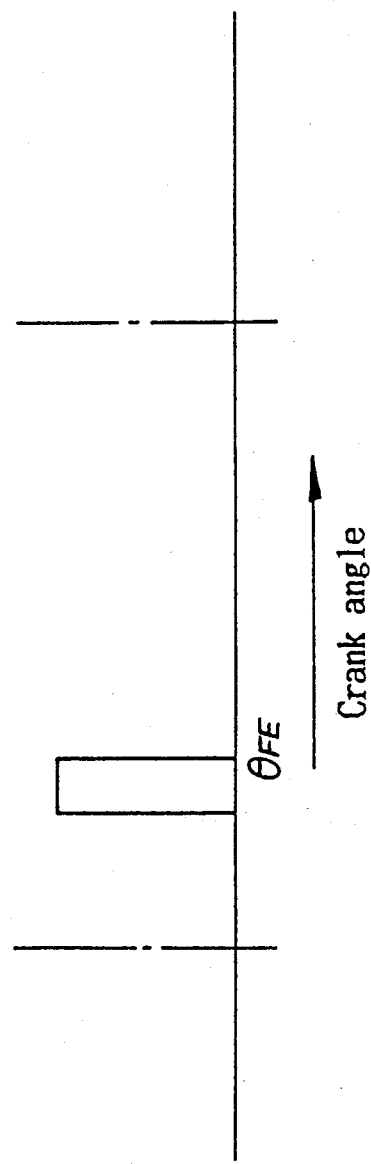

FIGS. 9, 10 and 11 illustrate another embodiment of the present invention, wherein parts or components corresponding to those in the above-described embodiment are designated by the like reference numbers and characters.

A valve operating system 18' in this embodiment comprises a cam shaft 19', first, second and third intake rocker arms 71, 72 and 73 as valve operating members for converting the rotating movements of the cam shaft 19' into the opening and closing motions of the intake valves $V_{I1}$ and $V_{I2}$, and first and second exhaust rocker arms 22 and 23 for converting the rotating movement of the cam shaft 19' into the opening and closing motions of the exhaust valves $V_{E1}$ and $V_{E2}$.

Integrally provided on the cam shaft 19' are a first intake opening and closing cam 74 having a shape corresponding to a low speed operation of the engine, a second intake opening and closing cam 75 formed into a shape corresponding to a high speed operation of the engine and disposed adjacent one side of the first intake opening and closing cam 74, a slightly-operating cam 76 disposed adjacent one side of the second intake opening and closing cam 75, and exhaust opening and closing cams 27, 27 on opposite sides of the first intake opening and closing cam 74 and the slightly-operating cam 76.

The first intake rocker arm 71 is operatively connected to one intake valve $V_{I1}$, and the third intake rocker arm 73 is operatively connected to the other intake valve $V_{I2}$. The second intake rocker arm 72 is disposed between the first and third intake rocker arms 71 and 73, so that it can be separately moved relative to the intake valves $V_{I1}$ and $V_{I2}$. The intake rocker arms 71, 72 and 73 are swingably carried on the intake rocker shaft 28. The first and second rocker arms 22 and 23 operatively connected to the exhaust valves $V_{E1}$ and $V_{E2}$ respectively are swingably carried on the exhaust rocker shaft 29.

One end of the first intake rocker arm 71 comes into sliding contact with the first intake opening and closing cam 74, and one end of the third intake rocker arm 73 comes into sliding contact with the slightly operating cam 76. The second intake rocker arm 72 comes into sliding contact with the second intake opening and closing cam 75. One ends of the exhaust rocker arms 22 and 23 come into sliding contact with the exhaust opening and closing cams 27, 27, respectively.

A support plate 78 is fixedly mounted on an upper end of the holders 24, and a lost motion mechanism 79 is disposed on the support plate 78 for resiliently biasing the second intake rocker arm 72 in a direction to come into sliding contact with the second intake opening and closing cam 75 of the cam shaft 19'.

A valve operational characteristic switchover means 35' is provided in the intake rocker arms 71, 72 and 73 and comprises a connecting piston 82 capable of connecting the first and second intake rocker arms 71 and 72, a connecting pin 83 capable of connecting the second and third intake rocker arms 72 and 73, a restraining member 84 for restraining the movements of the connecting piston 82 and the connecting pin 83, and a return spring 85 for biasing the connecting piston 82, the connecting pin 83 and the restraining member 84 to their disconnected positions.

The connecting piston 82 is slidably received in the first intake rocker arm 71 for movement in the axial direction parallel to the intake rocker arm 28, and a hydraulic pressure chamber 86 is defined between one end of the connecting piston 82 and the first intake rocker arm 71 to lead to an oil passage 41 in the intake rocker shaft 28. The connecting pin 83 having one end abutting against the other end of the connecting piston 82 is slidably received in the second intake rocker arm 72 for sliding movement in the axial direction parallel to the intake rocker shaft 28. Further, the bottomed cylindrical restraining member 84 abutting against the other end of the connecting pin 83 is slidably received in the third intake rocker arm 73 for sliding movement in the axial direction parallel to the intake rocker shaft 28, and the return spring 85 is mounted in a compressed manner between the restraining member 84 and the third rocker arm 73.

In such valve operational characteristic switchover means 35', if the hydraulic pressure in the hydraulic pressure chamber 86 is released mainly in a low speed rotation region of the engine, the abutment surfaces of the connecting piston 82 and the connecting pin 83 assume a position between the first and second intake rocker arms 71 and 72, and the abutment surfaces of the connecting pin 83 and the restraining member 84 assume a position between the second and third intake rocker arms 72 and 73. Thus, the rocker arms 71, 72 and 73 are in their states in which they are angularly displaceable relative to one another. The first intake rocker arm 71 is swung in response to the sliding contact with the first intake opening and closing cam 74 by rotation of the cam shaft 19', so that one of the intake valves $V_{I1}$ is opened and closed with a timing and a lift amount depending upon the shape of the first intake opening and closing cam 74. The third intake rocker arm 73 in sliding contact with the slightly operating cam 76 is brought into a substantially inoperative state, so that the other intake valve $V_{I2}$ can be brought into a substantially inoperative state. Further, the second intake rocker arm 72 is swung in response to the sliding contact with the second intake opening and closing cam 75, but such swinging movement exerts no influence on the first and third intake rocker arms 71 and 73. In addition, the exhaust valves $V_{E1}$ and $E_{E2}$ are opened and closed with a timing and a lift amount depending upon the shape of the exhaust opening and closing cams 27, 27.

An opening angle middle time $\theta_{C2}$ in a slight lift curve $C_2$ for the intake valve $V_{I2}$ opened by the slightly operating cam 76 is established, as shown in FIG. 11, in a suction stroke at a point delayed angularly along the crank angle from an opening angle middle time $\theta_{C1}'$ in a valve-opening lift curve $C_1'$ for the intake valve $V_{I1}$ opened by the first intake opening and closing cam 74, desirably in a range of 130 to 180 degrees. Moreover, a valve-closing time $\theta_{VC}$ for the intake valve $V_{I2}$ slightly opened by the slightly operating cam 76 is established at a point falling in a buffer curve section $C_{1S}'$ at a terminal end along the crank angle of the valve-opening lift curve $C_1'$ for the intake valve $V_{I1}$ opened by the first intake opening and closing cam 74.

If a high hydraulic pressure is applied to the hydraulic pressure chamber 86 mainly in a high speed rotation region of the engine, the connecting piston 82 is moved in a direction to increase the volume of the hydraulic pressure chamber 86 against a spring force of the return spring 85, while urging the connecting pin 83. When the axes of the connecting piston 82, the connecting pin 83 and the restraining member 84 are aligned with one another, i.e., when the intake rocker arms 71. 72 and 73 have entered their stationary states, the connecting piston 82 is fitted into the second intake rocker arm 72 and in response thereto, the connecting pin 83 is fitted into the third intake rocker arm 73, thereby bringing the intake rocker arms 71, 72 and 73 into their connected states. Thus, the first and third intake rocker arms 71 and 73 are swung together with the second intake rocker arm 72 being in sliding contact with the second intake opening and closing cam 75, thereby causing the intake valves $V_{J1}$ and $V_{J2}$ to be opened and closed with a timing and a lift amount depending upon the shape of the second intake opening and closing cam 75. In addition, the exhaust rocker arms 22 and 23 cause the exhaust valves $V_{E1}$ and $V_{E2}$ to be opened and closed with a timing and a lift amount depending upon the shape of the exhaust opening and closing cams 27, 27, as in the low speed operation region.

Also in the internal combustion engine equipped with this valve operating system 18', an effect similar to that in the previously described embodiment shown in FIGS. 1 through 8 can be provided by conducting a control similar to that in the former embodiment.

What is claimed is:

1. An internal combustion engine comprising:
   a valve operating system connected to a pair of intake valves and arranged to selectively open one of said intake valves only a very small amount that places said one intake valve into a substantially inoperative state during a normal suction stroke mainly in a low speed operation region of the engine;
   a fuel injection valve capable of injecting fuel toward a pair of intake ports which independently correspond to said pair of intake valves; and
   a control means for controlling an operation of said fuel injection valve, wherein
   said control means is arranged to control said fuel injection so as to have a time of completing the fuel injection within a normal suction stroke, and wherein
   said time of completing said fuel injection is established in a first half of a normal suction stroke in an operational condition in which only the other one of said pair of intake valves is being opened and closed in a normal suction stroke.

2. An internal combustion engine according to claim 1, wherein said valve operating system comprises a cam shaft provided with a plurality of cams including an opening and closing cam for opening and closing the other one of the pair of intake valves in the suction stroke mainly in a low speed operation region of the engine, and a slightly operating cam for opening the one intake valve only in a very small amount so as to place the one intake valve into said substantially inoperative state, and a valve operational characteristic switchover means capable of switching-over the operational characteristics of the intake valves in accordance with an operational condition of the engine, said slightly operating cam being formed to open the one intake valve in a slight lift curve having an opening angle middle time at a delayed angle side from an opening angle middle time in an opening lift curve for the other intake valve opened by said opening and closing cam mainly in the low speed operation region of the engine and further having a terminal end time in the vicinity of a buffer curve portion at a terminal end along a crank angle in said valve opening lift curve.

3. An internal combustion engine according to claim 2, wherein a maximum lift point in the slight lift curve by the slightly operating cam is established at a later side along the crank angle from a maximum lift point in the opening lift curve by said opening and closing cam.

4. An internal combustion engine according to claim 2, wherein said valve operating system includes a plurality of valve operating members provided adjacent one another between the cams of the cam shaft and the pair of intake valves, said valve operational characteristic switchover means being arranged to be able to switch over the connection and disconnection of the adjacent valve operating members to and from each other.

5. An internal combustion engine according to claim 1, wherein the time of completing the fuel injection is in a range of 50 to 90 degrees from a point of starting the suction stroke along the crank angle.

6. An internal combustion engine comprising:
   a valve operating system connected to a pair of intake valves and arranged to selectively open one of said intake valves only a very small amount that places the one intake valve into a substantially inoperative state during a normal suction stroke mainly in a low speed operation region of the engine;
   a fuel injection valve capable of injecting fuel toward a pair of intake ports which independently correspond to said pair of intake valves; and
   a control means for controlling an operation of said fuel injection valve, a combustion of a dilute air-fuel mixture being possible at least in an engine operational region in which said one intake valve is in said substantially inoperative state, wherein
   a recess is provided in a surface of a piston which is exposed to a combustion chamber of the engine so as to form a portion of said combustion chamber, said valve operating system is arranged so as to cause an opening angle middle time for said one intake valve in said substantially inoperative state to come in a second half of a normal suction stroke, and said control means is arranged to establish a fuel injection completion time to come in a first half of the suction stroke and control said fuel injection valve when said one intake valve is in said substantially inoperative state.

7. An internal combustion engine according to claim 1 or 6, wherein said valve operating system is arranged so that it can be switched over between a state in which said one intake valve is brought into its substantially inoperative state and the other intake valve is opened and closed in an opening and closing mode corresponding to mainly the low speed operation region of the engine, and a state in which both the intake valves are opened and closed in an opening and closing mode corresponding to mainly a high speed operation region of the engine.

8. An internal combustion engine according to claim 1 or 6, further including an exhaust gas sensor mounted to an exhaust pipe from the engine for linearly detecting the composition of an exhaust gas, said exhaust gas sensor being connected to said control means to provide a feed-back control during combustion of a dilute air-fuel mixture in the engine.

9. An internal combustion engine comprising:
   a valve operating system connected to a pair of intake valves and a pair of exhaust valves and arranged to selectively open one of said intake valves only a very small amount that places said one intake valve into a substantially inoperative state during a normal suction stroke mainly in a low speed operation region of the engine;
   a fuel injection valve capable of injecting fuel toward a pair of intake ports which independently correspond to said pair of intake valves; and a control means for controlling an operation of said fuel injection valve, a combustion of a dilute air-fuel mixture being possible at least in an engine operation region in which said one intake valve is in said substantially inoperative state, wherein a recess is provided in an upper surface of a piston which is exposed to a combustion chamber of the engine so as to form a portion of said combustion chamber and a spark plug is disposed substantially at a central portion of a ceiling surface of the combustion chamber, and wherein said valve operating system includes a single cam shaft common to said intake valves and said exhaust valves and arranged so as to cause an opening angle middle time for said one intake valve in said substantially inoperative state to come in a second half of a normal suction stroke, and said control means is arranged to control said fuel injection valve to cause a completion of fuel injection to occur in a first half of the suction stroke when said one intake valve is in said substantially inoperative state.

10. An internal combustion engine having a pair of intake ports connected to a combustion chamber and a pair of intake valves for opening and closing the pair of intake ports, respectively, the engine comprising:

a valve operating system for operating the pair of intake valves for opening and closing thereof in a plurality of modes including a first mode in which both the intake valves are opened and closed in a normal manner in a suction stroke and a second mode in which a first intake valve of the pair of intake valves is opened and closed in the normal manner and a second intake valve of the pair of intake valves is held in a substantially inoperative state during the suction stroke;

a switchover means for establishing connection and disconnection between said pair of intake valves so as to selectively provide said first mode upon said connection and said second mode upon said disconnection mainly in a low speed operational region of the engine;

a fuel injection valve associated with both the pair of intake ports and capable of injecting fuel toward the ports;

a control means for controlling the fuel injection valve such that in said second mode the control means controls the fuel injection valve so as to complete fuel injection in a first half of the suction stroke;

wherein in said second mode said second intake valve of the pair of intake valves has a slight amount of valve lift of which a maximum lift point comes later along a crank angle than a maximum lift point of an opening lift curve established by said first intake valve of the pair of intake valves in this second mode.

11. An internal combustion engine according to claim 10 wherein an amount of lift of said first intake valve in said first mode is larger than the amount of lift of said first intake valve in said second mode.

12. An internal combustion engine according to claim 10, wherein the entire fuel injection is conducted and completed at a point falling in a range of 50 to 90 degrees from a point of starting the suction stroke along the crank angle.

13. An internal combustion engine comprising:

a valve operating system connected to a pair of intake valves and arranged to selectively open one of said intake valves only a very small amount that places said one intake valve into a substantially inoperative state during a normal suction stroke mainly in a low speed operation region of the engine;

a fuel injection valve capable of injecting fuel toward a pair of intake ports which independently correspond to said pair of intake valves; and a control means for controlling an operation of said fuel injection valve, wherein said control means is arranged to establish a fuel injection completion time within a normal suction stroke and control said fuel injection valve when said one intake valve is in said substantially inoperative state, wherein said valve operating system comprises a cam shaft provided with a plurality of cams including an opening and closing cam for opening and closing the other intake valve of the pair of intake valves in the suction stroke, and a slightly operating cam for opening said one intake valve only a very small amount such that the said one intake valve is brought into its substantially inoperative state mainly in said low speed operation region of the engine, and a valve operational characteristic switchover means capable of switching-over the operational characteristics of the pair of intake valves in accordance with the operational condition of the engine, said slightly operating cam being formed to open said one intake valve in a slight lift curve having an opening angle middle time at a delayed angle from an opening angle middle time in an opening lift curve for said other intake valve opened by said opening and closing cam and further having a terminal end time in the vicinity of a buffer curve portion at a terminal end along the crank angle in said valve opening lift curve, and wherein a maximum lift point in the slight lift curve by the slightly operating cam is established at a later side along the crank angle from a maximum lift point in the opening lift curve by said opening and closing cam.

14. An internal combustion engine comprising:

a valve operating system connected to a pair of intake valves and arranged to selectively open one of said intake valves only a very small amount that places said one intake valve into a substantially inoperative state during a normal suction stroke mainly in a low speed operation region of the engine;

a fuel injection valve capable of injecting fuel toward a pair of intake ports which independently correspond to said pair of intake valves; and a control means for controlling an operation of said fuel injection valve, wherein said control means is arranged to establish a fuel injection completion time within a normal suction stroke and control said fuel injection valve when said one intake valve is in said substantially inoperative state, wherein said valve operating system comprises a cam shaft provided with a plurality of cams including an opening and closing cam for opening and closing the other intake valve of the pair of intake valves in the suction stroke, and a slightly operating cam for opening said one intake valve only a very small amount such that the said one intake valve is brought into its substantially inoperative state mainly in said low speed operation region of the engine, and a valve operational characteristic switchover means capable of switching-over the operational characteristics of the pair of intake valves in accordance with the operational condition of the engine, said slightly operating cam being formed to open said one intake valve in a slight lift curve having an opening angle middle time at a delayed angle said from an opening angle middle time in an opening lift curve for said other intake valve opened by said opening and closing cam and further having a terminal end time in the vicinity of a buffer curve portion at a terminal end along the crank angle in said valve opening lift curve, and wherein said valve operating system includes a plurality of valve operating members provided adjacent one another between the cams of the cam shaft and the pair of intake valves, said valve operational characteristic switchover means being arranged to be able to switch over the connection and disconnection of the adjacent valve operating members to and from each other.

* * * * *